(No Model.)
W. A. PALMER.
SPINNING TOP HOLDER.
No. 579,174.  Patented Mar. 23, 1897.
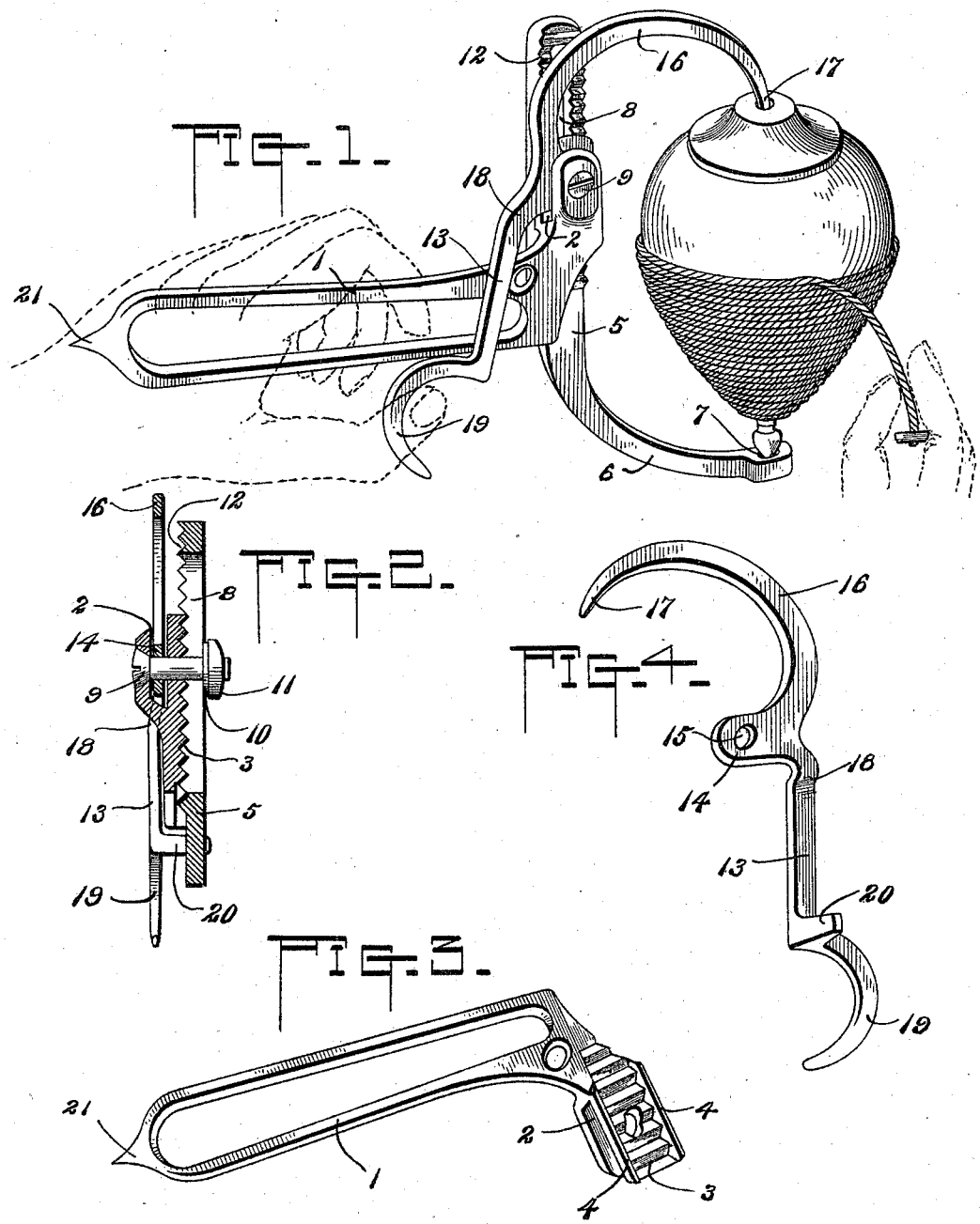
Witnesses
A. M. Poynton,
Jno. W. Cromwell.
Inventor
William A. Palmer,
By his Attorneys,
C. A. Snow & Co.

United States Patent Office.

WILLIAM A. PALMER, OF MOBILE, ALABAMA.

SPINNING-TOP HOLDER.

SPECIFICATION forming part of Letters Patent No. 579,174, dated March 23, 1897.

Application filed March 21, 1896. Serial No. 584,303. (No model.)

*To all whom it may concern:*

Be it known that I, WILLIAM A. PALMER, a citizen of the United States, residing at Mobile, in the county of Mobile and State of Alabama, have invented a new and useful Spinning-Top Holder, of which the following is a specification.

This invention relates to improvements in devices for holding tops by means of which the spinning of the same will be rendered easier and greater amusement derived therefrom.

The object of the invention is to provide a device of the character mentioned wherein shall be embodied simple and efficient means for securely holding the top and so constructed as to adapt the same for use with tops of any size.

To this end the invention consists, substantially, in the construction, combination, and arrangement of parts, as will be hereinafter fully illustrated, described, and claimed.

In the accompanying drawings, Figure 1 is a perspective view of the holder having a top in position therein. Fig. 2 is a transverse sectional view with the top removed. Fig. 3 is a detail perspective view of the handle, illustrating the reverse side thereof. Fig. 4 is a similar view of the retaining-lever.

Similar numerals of reference indicate corresponding parts throughout the figures.

Referring to the drawings, 1 designates a handle formed of any suitable material and provided at one of its ends with a bifurcation 2. One side of this bifurcated end is serrated, as at 3, and is provided with flanges 4, forming a guide. Mounted between the flanges 4 is a supporting-arm 5, the lower end 6 of which is curved and is provided with a depression 7, forming a bearing for the point of the top. The opposite end of this arm has an elongated slot 8, through which passes a screw 9 or its equivalent, having a washer 10 and a nut 11 mounted thereon. Serrations 12 are formed on the side of the arm 5 adjacent to the bifurcated end of the handle, and these serrations 12 engage with the serrations 3, in order to retain the arm 5 in any desired position upon the handle 1.

For holding the top upon the supporting-arm 5 a retaining-lever 13 is employed. This lever is provided with a projection 14, having an opening 15 therein, and such projection passes into the bifurcation 2, where it is pivotally secured by means of the screw 9. As before stated, the screw 9 also passes through the slot 8 in the arm 5, and it will therefore be seen that such screw is sufficient to hold the several parts of the device in their proper operative relation. The upper portion of the lever 13 is curved, as at 16, and the extreme end 17 thereof is pointed, such pointed end entering an aperture in the head of the top and serving to retain the same upon the arm 5. At a point adjacent to the projection 14 the lever 13 is provided with an offset 18, by means of which the lower portion of such lever is thrown out of alinement with the handle 1. This will permit the lever to be easily operated and contact of the same with the handle prevented. A finger-hold 19 is formed at the lower end of the lever 13, and projecting from the latter and under the handle 1 is a stop 20, which contacts with such handle and thereby limits the downward movement of the pointed end 17.

The handle 1, opposite to the bifurcated end, is provided with a nib 21, which is designed to be used in forming an aperture in the head of the top for receiving the end 17 of the lever 13.

The operation of the herein-described device will be readily understood by those skilled in the art.

When it is desired to spin the top, the screw 9 is loosened and the arm 5 adjusted to such a position as will permit the top to rotate after having been placed in the holder. The screw is then tightened, thereby binding the arm against the handle, and the cord wound upon the top, as usual. The operator then grasps the handle in one hand, the other hand holding the top, after which the point of the latter is placed in the depression 7. One finger of the hand grasping the handle is placed in the finger-hold 19 and pressure applied thereto. This causes the stop 20 to move toward the under side of the handle, and when such stop contacts with said handle the pointed end 17 will have been forced into the aperture in the head of the top. By reason of the pointed end being limited in its downward movement such end will not bind upon the top, thereby permitting the latter to freely rotate within the holder. The string on the top is now given a quick pull and the finger released from the finger-hold 19, when the top will immediately pass from the holder upon the spinning-surface. As illustrated in the drawings, it will be observed that the projection 14 is nearer the curve 16 in the lever 13 than the finger-hold 19. This gives greater weight to the lower portion of said lever than the upper portion thereof, and when pressure is withdrawn from the finger-hold the latter, by reason of the greater weight, returns to its normal position, thereby releasing the pointed end 17 from engagement with the aperture in the head of the top.

The advantages of my holder will be at once apparent. The method of spinning tops heretofore so long in use is dispensed with and the operation so simplified that any one may perform the same with great ease and enjoyment. It is further obvious that the holder is adapted for use with tops of any size.

Changes in the form, proportion, and the minor details of construction may be resorted to without departing from the principle or sacrificing any of the advantages of this invention.

Having thus described my invention, what I claim is—

1. In a spinning-top holder, the combination with a handle, and a supporting-arm thereon adapted to engage a top at one extremity of its axis, of a pivoted retaining-lever adapted at one end to engage and hold the top in engagement with said arm and having a stop to limit the movement of its engaging end toward said arm, the lever being yieldingly held in its normal or inoperative position and being adapted to be manually held in its operative position, substantially as specified.

2. In a spinning-top holder, the combination with a handle, and a supporting-arm thereon adapted to engage the plug of a top, of a pivoted retaining-lever adapted at one end to engage and hold the top upon said supporting-arm and provided at the other end with a finger-hold arranged contiguous to the handle, the arm of the lever which carries the finger-hold being of greater weight than the other to normally hold the engaging end of the lever out of operative position, substantially as specified.

3. The herein-described spinning-top holder having a handle provided with a pointed nib for indenting a top at the extremity of the latter opposite to its plug, a supporting-arm carried by the handle and provided with a socket to engage a top-plug, and a yielding retaining-lever having a reduced terminal adapted to fit in the indentation of a top formed by said nib, whereby a top of the ordinary construction may be adapted for engagement by the holder, substantially as specified.

4. In a spinning-top holder, the combination, with a handle, of a supporting-arm carried by such handle and adjustably secured thereto, said arm adapted to receive the plug of a top, and a retaining-lever also carried by the handle and adapted to hold the top upon the supporting-arm, substantially as set forth.

5. In a spinning-top holder, the combination, with a handle provided with a bifurcated end, of a supporting-arm carried by the handle and having a bearing in one of its ends for receiving the plug of a top, and a retaining-lever also carried by the handle and provided with a projection pivoted within the bifurcated end of the handle, such lever adapted to hold the top upon the supporting-arm, substantially as set forth.

6. In a spinning-top holder, the combination, with a handle, of a supporting-arm carried by the handle and having a bearing in one end and a slot in its other end, the bearing in such arm adapted to receive the plug of a top, a retaining-lever pivoted to the handle, and adapted to hold the top upon the supporting-arm, and a screw passing through the slot in the supporting-arm and securing the several parts together, substantially as set forth.

7. In a spinning-top holder, the combination, with a handle one side of which is provided with serrations, of a supporting-arm carried by the handle and having one of its faces serrated, the serrations of the supporting-arm being adapted to engage with the serrations of the handle, and a retaining-lever also carried by the handle and having its upper end pointed and its lower end forming a finger-hold, said retaining-lever being adapted to hold a top upon the supporting-arm, substantially as set forth.

8. In a spinning-top holder, the combination, with a handle having one end constructed to form a nib, of a supporting-arm having one of its ends curved and provided with a bearing adapted to receive the point of a top, a retaining-lever pivoted to the handle and adapted to hold the top upon the supporting-arm, such retaining-lever being offset at its lower end to occupy a position at one side of the handle, and a stop for limiting the movement thereof, and means for securing the several parts together, substantially as set forth.

9. In a spinning-top holder, the combination, with a handle having a bifurcated end one side of which is provided with serrations and flanges, of a supporting-arm having one of its ends curved and its other end provided with serrations adapted to fit between the flanges and engage the serrations on the handle, a retaining-lever having its upper end curved and pointed and its lower end provided with a finger-hold, such retaining-lever also having a projection pivoted within the bifurcated end of the handle, and means for securing the several parts together, substantially as set forth.

In testimony that I claim the foregoing as my own I have hereto affixed my signature in the presence of two witnesses.

WILLIAM A. PALMER.

Witnesses:
 DANIEL B. COBBS,
 M. P. CANFIELD.